United States Patent
Iemura

(10) Patent No.: US 8,001,196 B2
(45) Date of Patent: Aug. 16, 2011

(54) SYSTEM FOR PERFORMING NOTIFICATION IN RESPONSE TO SUBSEQUENT RECEPTION IN ACCORDANCE WITH ORIGINATOR OF PREVIOUS RECEPTION

(75) Inventor: Atsuhito Iemura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 241 days.

(21) Appl. No.: 12/361,514

(22) Filed: Jan. 28, 2009

(65) Prior Publication Data

US 2009/0198786 A1    Aug. 6, 2009

(30) Foreign Application Priority Data

Jan. 30, 2008    (JP) ................................. 2008-018905

(51) Int. Cl.
*G06F 15/16* (2006.01)

(52) U.S. Cl. ... 709/206; 709/207; 709/204; 379/142.06; 379/142.04

(58) Field of Classification Search .................. 709/204, 709/206, 207; 379/142.06, 142.04; 455/566, 455/411, 412.1, 415; 705/27
See application file for complete search history.

(56) References Cited

U.S. PATENT DOCUMENTS

| | | | |
|---|---|---|---|
| 2003/0100295 A1* | 5/2003 | Sakai et al. | 455/415 |
| 2004/0088359 A1* | 5/2004 | Simpson | 709/206 |
| 2004/0176072 A1* | 9/2004 | Gellens | 455/412.1 |
| 2005/0071253 A1* | 3/2005 | Yang | 705/27 |
| 2005/0085274 A1* | 4/2005 | Lee | 455/566 |
| 2007/0190976 A1* | 8/2007 | Hoshino et al. | 455/411 |

FOREIGN PATENT DOCUMENTS

JP    2001217903    8/2001

* cited by examiner

*Primary Examiner* — Le Luu
(74) *Attorney, Agent, or Firm* — Morrison & Foerster LLP

(57) ABSTRACT

A communication device includes a communication unit configured to communicate with an external communication device, and a first storage unit configured to store, when a phone call or an e-mail is received, information on a caller or a sender of the e-mail. A notification is performed in response to the reception, and a controller determines, when a reply to a first reception performed by a first communication function of the communication unit is not performed and a second reception performed by a second communication function of the communication unit is performed, whether a caller or a sender relating to the second reception is identical to a caller of a sender relating to the first reception in accordance with the information on the caller or the sender stored in the first storage unit. A notification is performed in response to the second reception in accordance with a result of the determination.

16 Claims, 6 Drawing Sheets

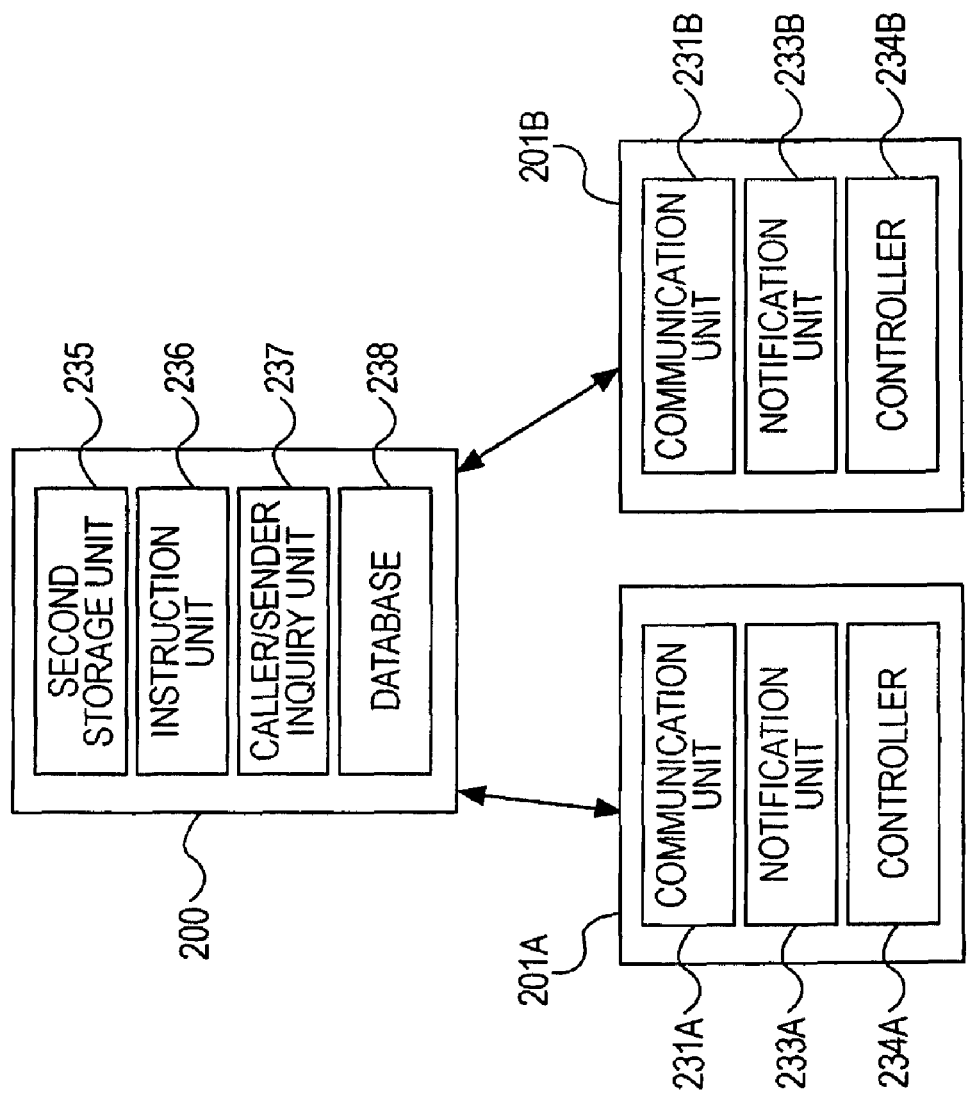

SYSTEM FOR PERFORMING NOTIFICATION IN RESPONSE TO SUBSEQUENT RECEPTION IN ACCORDANCE WITH ORIGINATOR OF PREVIOUS RECEPTION

CROSS-REFERENCE TO RELATED APPLICATION

The present application claims priority under 35 U.S.C. §119 to Japanese Patent Application No. 2008-018905, filed, Jan. 30, 2008, entitled "COMMUNICATION DEVICE AND COMMUNICATION SYSTEM," the entirety of which is incorporated herein by reference.

BACKGROUND OF THE INVENTION

1. Field of the Invention

The present invention relates to communication devices and communication systems, and more particularly relates to a communication device which performs a notification in response to a reception of a call or an e-mail.

2. Description of the Related Art

In general, cellular phones, which are examples of communication devices, have a function of storing information when incoming calls arrive, providing telephone numbers of callers by making use of a caller ID notification function and displaying incoming-call histories in a case where users cannot answer phone calls. With these functions, even when the users do not notice the incoming calls, the users can check the times of the incoming calls and the phone numbers of the callers afterward.

Since the display of the incoming-call histories is performed irrespective of caller IDs and the number of incoming calls, there is a possibility that the users (receivers) do not notice urgent calls. To address this problem, a technique of easily notifying a user of importance and urgency of an incoming call in a case where an identical caller calls the user a plurality of times in a predetermined period of time has been proposed.

However, in a case where the user did not answer phone calls from the caller, the caller may not call several times but may leave a message saying "call me back", for example, on an answering machine, and in addition to the message, may send another message by a second communication function (e-mail, for example). Alternatively, in a case where the caller does not receive a reply after sending the e-mail, the caller may use the second communication function (a phone call, for example).

In such instances, there is a demand for appropriately dealing with important messages or urgent situations.

BRIEF SUMMARY OF THE INVENTION

The presently disclosure is directed to solving one or more of the problems presented in the prior art, described above, as well as providing additional features that will become readily apparent by reference to the following detailed description when taken in conjunction with the accompanying drawings.

According to one aspect of the present disclosure, a communication device includes a communication unit configured to communicate with an external communication device; a first storage unit configured to store, when a phone call or an e-mail is received by the communication unit, information on a caller of the phone call or a sender of the e-mail; a notification unit configured to perform a notification in response to the reception; and a controller configured to determine, when a reply to a first reception is not performed and a second reception is performed, whether a caller or a sender relating to the second reception is identical to a caller or a sender relating to the first reception in accordance with the information on the caller or the sender stored in the first storage unit, and configured to perform a notification in response to the second reception in accordance with a result of the determination.

According to another aspect, a communication system includes a communication unit configured to communicate with other communication devices through a server; a notification unit configured to perform a notification in response to a reception performed by the communication unit; and a controller configured to control the notification performed by the notification unit. The system further includes a second storage unit configured to store, when a first communication from a first communication device to a second communication device among the plurality of communication devices is performed, information on a caller or a sender relating to the first communication; and an instruction unit configured to determine whether a communication has been performed between the first and second communication devices as the first communication, and configured to instruct the notification unit to transmit a notification to the second communication device in a preset mode in a case where it is determined that the first communication has not been performed, and a second communication to the second communication device is performed, and it is determined that a caller or a sender relating to the second communication is identical to a caller or a sender relating to the first communication performed by the first communication device based on the information on the caller or the sender relating to the first communication. The controller of the second communication device instructs the notification unit to perform a notification in the preset mode when the communication unit of the second communication device receives a notification instruction signal issued by the instruction unit.

According to yet another aspect, a notification method of a communication device includes: receiving a first communication signal; receiving a second communication signal; determining whether an entity associated with the first communication signal is identical to an entity associated with the second communication signal; performing a first notification if it is determined that the entity associated with the first communication signal is identical to the entity associated with the second communication signal; and performing a second notification different from the first notification if it is determined that the entity associated with the first communication signal is not identical to the entity associated with the second communication signal.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure.

FIG. 7 is a block diagram illustrating a function of a communication system including a mobile phone device and a server, according to one aspect of the present disclosure.

DESCRIPTION OF THE PREFERRED EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Figure 1:
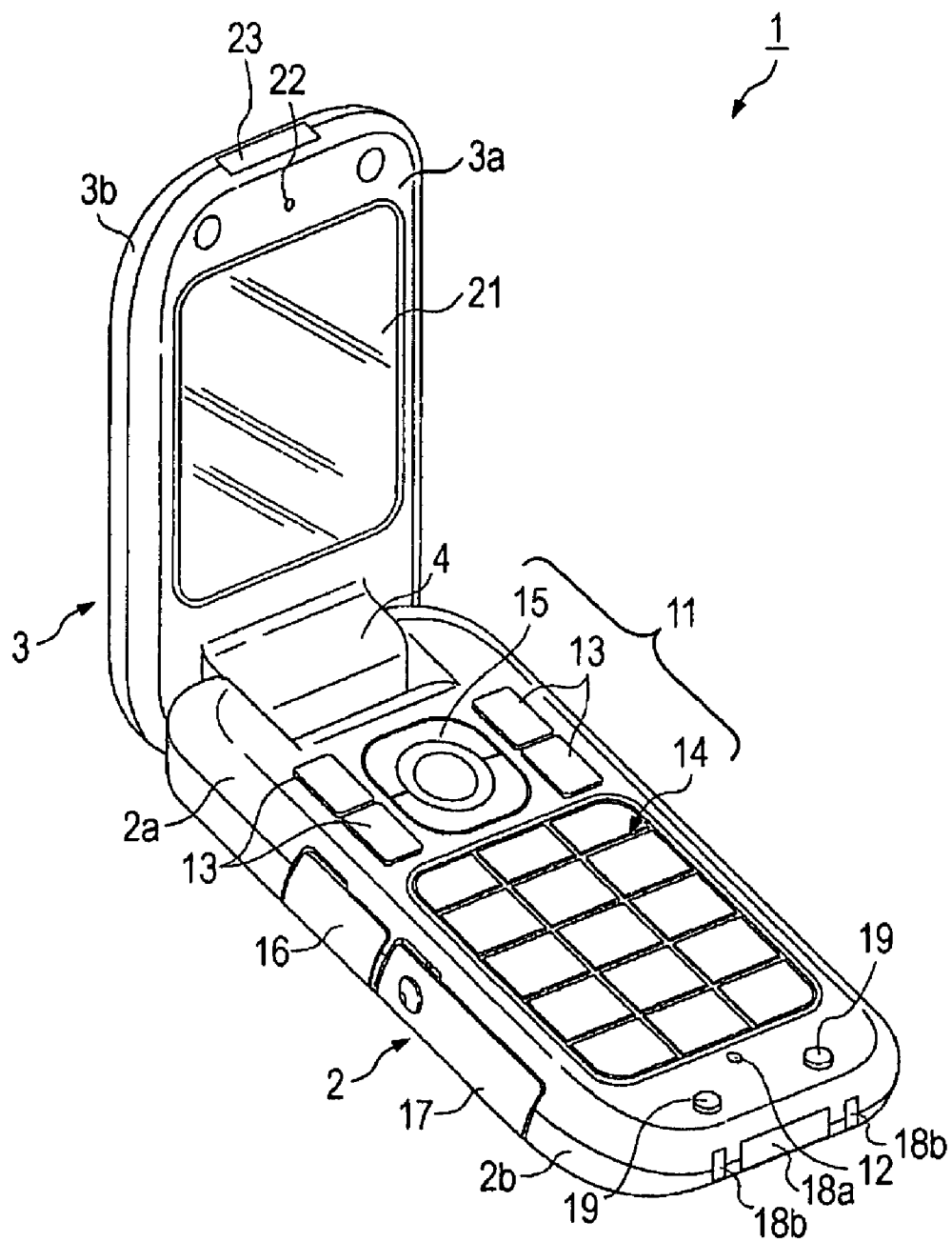
FIG. 1 is an external perspective view of a mobile phone in an open state according to one aspect of the present disclosure.

Exemplary embodiments of the invention are now described with reference to the drawings. FIG. 1 is an external perspective view of a mobile phone 1 capable of communicating with external devices (or a base station) according to an embodiment of the present invention.

Referring to FIG. 1, the mobile phone 1 includes an operating housing 2 having an operating section, a display housing 3 having a display section, and a hinge mechanism 4 connecting the operating housing 2 and the display housing 3. The exterior of the operating housing 2 is formed by a front case 2a and a rear case 2b. The exterior of the display housing 3 is formed by a front case 3a and a rear case 3b.

The operating housing 2 includes an operation button group 11 and a voice input part 12 that are exposed to a surface of the front case 2a. The operation button group 11 includes function setting operation buttons 13, input operation buttons 14, and determination operation buttons 15. The function setting operation buttons 13 are used to activate various settings and functions, such as an address book function and an e-mail function. The input operation buttons 14 are assigned numbers and characters, and used to enter phone numbers or characters to create an e-mail message. The determination operation buttons 15 are used, for example, to confirm determinations and perform scrolling in various operations. A side of the operating housing 2 is provided with an earphone connector cap 16 and a cap 17 for covering an interface (not shown) for communicating with external devices (or a base station). A lower end of the operating housing 2 is provided with a cap 18a for covering a charging connector (not shown) and a pair of charging contacts 18b. The voice input part 12 is used to input a voice from the user of the mobile phone 1 during a call.

The display housing 3 includes a display 21 for displaying various kinds of information, and a call speaker 22 configured to output a voice of a person taking through the phone. An upper end of the display housing 3 is provided with an infrared communication unit 23 configured to perform infrared communication with other mobile phones etc.

The hinge mechanism 4 connects the operating housing 2 and the display housing 3 to allow their relative movement. The hinge mechanism 4 allows the mobile phone 1 to switch between an in-use state (open state) and a stored state (folded state). In the in-use state, the operating housing 2 and the display housing 3 are open with respect to each other. In the stored state, the front side of the operating housing 2 and the front side of the display housing 3 face each other.

Here, the mobile phone 1 (i.e., so-called foldable mobile phone), in which the operating housing 2 and the display housing 3 relatively move through the hinge mechanism 4, is discussed as an example of a communication device. However, the present invention is applicable not only to such a foldable mobile phone 1, but also to a slidable mobile phone in which one of the operation-unit housing 2 and the display-unit housing 3 can be slid relative to the other one in a certain direction from the state in which the operation-unit housing 2 and the display-unit housing 3 are stacked on each other, a rotational mobile phone in which one of the operation-unit housing 2 and the display-unit housing 3 can be rotated relative to the other one about a line which extends in a direction in which the operation-unit housing 2 and the display-unit housing 3 are stacked on each other, a mobile phone in which the operating housing 2 and the display housing 3 are connected to each other through a two-axis hinge, or a (so-called strait type) mobile phone in which the operating housing 2 portion and the display housing 3 portion are disposed in one housing. In a straight type, the first casing portion 2 and the second casing portion 3 are disposed in one casing. One of ordinary skill in the art would realize that the mobile phone 1 is merely one example of a mobile device and various other mobile devices may be used without departing from the scope of the present invention.

Figure 2:
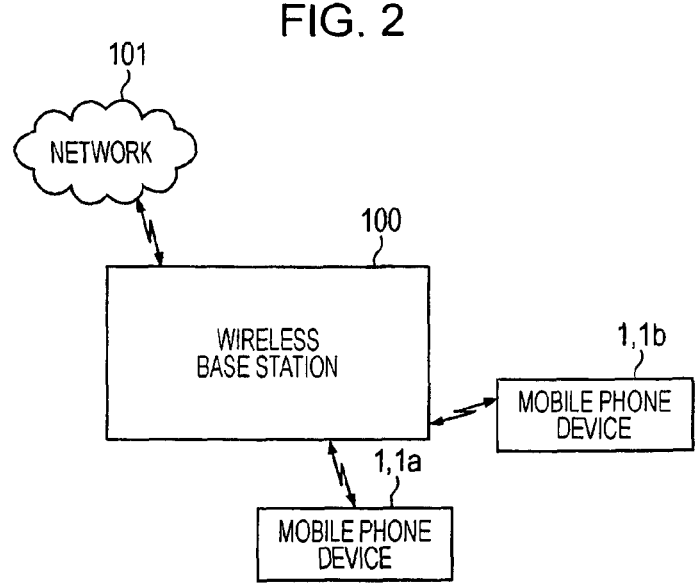
FIG. 2 is a schematic view illustrating a state where mobile phones are connected to a network via a wireless base station, according to one aspect of the present disclosure.

As illustrated in FIG. 2, mobile phones 1 (1a and 1b) are connected via wireless connection such that they communicate with a network 101 via a wireless base station 100. For example, it is assumed in one embodiment that a first user of a first mobile phone device 1a sends an e-mail to a second user of a second mobile phone device 1b, but the e-mail is not viewed (checked) by the second user, and therefore, the first user of the first mobile phone device 1a makes a phone call to the second user of the second mobile phone device 1b. In this case, the second mobile phone device 1b stores information on a reception of the e-mail transmitted from the first mobile phone device 1a, information on an address of the sender of the e-mail, and information on a name of the sender, and makes an inquiry about the sender and a caller using these pieces of information. When it is determined that the sender and the caller are an identical person, the phone call is notified by a notification in a first mode, which is different from a notification in a second mode serving as a preset normal notification. For example, a first melody is set so as to be output from a speaker in the first mode, whereas a second melody is set so as to be output from the speaker while a vibration function is performed in the second mode. Here, only the first mode may be set by a user and the second mode may be set in advance. Alternatively, the first and second modes may be set by the user. In the first mode, an alarm may be sounded for a notification of urgency or a red LED (Light-Emitting Diode) may be turned on with sound.

Figure 3:
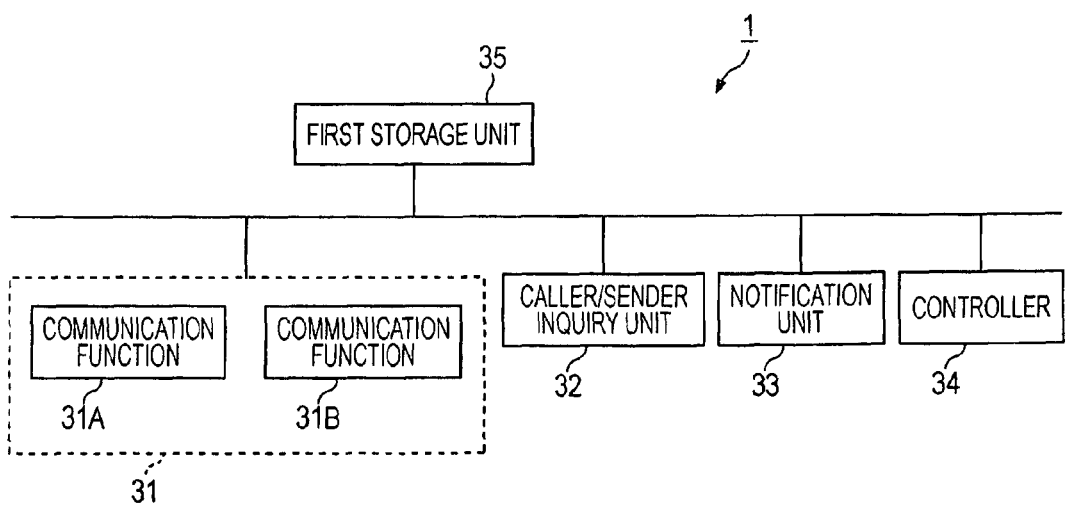
FIG. 3 is a functional block diagram illustrating functions of the mobile phone, according to one aspect of the present disclosure.

This function of the mobile phone 1, according to one embodiment, is described with reference to FIG. 3. The mobile phone 1 includes a communication unit 31, a caller/sender inquiry unit 32, a notification unit 33, a controller 34 and a first storage unit 35. The communication unit 31 performs a wireless communication. When a reception is performed by any one of communication functions 31A and 31B in a communication unit 31, the caller/sender inquiry unit 32 inquires a caller of the reception by accessing a database (for example, an address book stored in a memory in a mobile phone 1) where phone numbers and/or e-mail addresses of callers are registered. The result of the inquiry is stored in the first storage unit 35. The notification unit 33 performs a regular (predetermined) notification. When a reception is performed by any one of communication functions 31A and 31B in a communication unit 31, the control unit 34 controls the notification unit 33 such that a regular (predetermined) notification (in a second mode) or another notification (in the first mode), which is different from the regular notification is performed.

A controller 34 controls a notification unit 33 so as to perform operations described below, according to one embodiment. When a first reception is performed by a first communication function 31A (a communication unit including a phone-call function, for example) included in a communication unit 31, a caller/sender inquiry unit 32 inquires a caller of the first reception, and a result (hereinafter referred to as a "first result") of the inquiry is stored in a first storage unit 35. Then, the controller 34 controls the notification unit 33 so as to perform the second notification in the second mode. In a case where while a reply to the second notification has not been performed, a second reception is performed by a second communication function 31B (a communication unit including a data communication (e-mail) function, for example) included in the communication unit 31, the caller/sender inquiry unit 32 inquires a sender of the second reception, and a result (hereinafter referred to as a "second result") of the inquiry is stored in the first storage unit 35. When it is determined that the caller represented by the first result of the inquiry stored in the first storage unit 35 is identical to the sender represented by the second result of the inquiry stored in the first storage unit 35, the first notification in the first mode which is different from the second mode serving as the preset mode is performed.

The controller 34 may control the notification unit 33 so that the notification unit 33 periodically performs the first notification until a reply to the first notification in the first mode or a reply to the second notification in the second mode which is different from the first mode is performed.

The controller 34 may further control the notification unit 33 as follows, according to one embodiment. It is assumed that a reply to the first notification in the first mode or a reply to the second notification in the second mode, which is different from the first mode, is not performed and a third reception is performed using one of the communication functions 31A and 31B included in the communication unit 31. In this case, the caller/sender inquiry unit 32 performs inquiry, and when it is determined that the caller represented by the first result of the inquiry stored in the first storage unit 35 is different from the sender represented by the second result of the inquiry stored in the first storage unit 35, the first notification in response to the second reception is performed in preference to the second notification in response to the third reception.

According to one embodiment, an important message is prevented from being buried in other messages, and accordingly, the user is reliably notified of the important message.

The communication functions of the communication unit 31 are not limited to these as long as telephone communication, transmission and reception of e-mails, or an operation of accessing message boards on websites (specifically, viewing and writing messages), for example, are realized using the communication functions.

When the communication unit 31 has a telephone communication function, a state in which a reply is not performed corresponds to a case where a reception operation is not performed in response to a reception of a phone call, or a case where the user has not returned a phone call for a certain period of time even when a missed-call number is displayed in the display 21. When the communication unit 31 has an e-mail transmission/reception function, the state in which a reply is not performed corresponds to a case where a message body of an arrived e-mail has not been viewed (checked), that is, a case where the arrived e-mail has remained as an unread message for a certain period of time. When the communication unit 31 has a function of viewing or writing a message on a message board, the state in which a reply is not performed corresponds to a case where a message body written on the message board has not been checked for a certain period of time.

When the communication unit 31 receives an incoming call or an incoming e-mail, the notification unit 33 performs certain display on a display 21, activates vibration, outputs a predetermined sound from the speaker, or notifies the user of the incoming call or the incoming e-mail by turning on a light-emitting unit such as the LED. The notification includes a notification which indicates a reception of a phone call, and a notification which indicates an arrival of an e-mail and which is performed immediately after the e-mail is arrived, and in addition, a notification which is repeatedly or intermittently performed until a reply is performed to the reception.

Among a plurality of possible types of reception for a mobile phone device 1, six exemplary types of reception will now be described with reference to the drawings so as to show how the controller 34 operates, according to various embodiments.

It is assumed that the first communication function 31A corresponds to a phone-call function, for example, hereinafter. The second notification in the second mode which is performed when a reception is performed by the first communication function 31A corresponds to a notification in the preset mode in which a first melody is output from the speaker, for example. In addition, under a certain condition, the first notification in the first mode, which is different from the preset mode in which a reception is performed by the first communication function 31A, corresponds to a notification in a mode in which vibration is activated while a second melody is output from the speaker, for example.

It is assumed that the second communication function 31B corresponds to a data communication function, for example, hereinafter. In the second mode of the second notification which is performed when a reception is performed by the second communication function 31B, a third melody is output from the speaker, for example. Furthermore, under a certain condition, in the first mode of the first notification which is performed when a reception is performed by the second communication function 31B, vibration is activated while a fourth melody is output from the speaker.

First Reception Type (E-Mail Reception and then Phone Call Reception)

Figure 4:
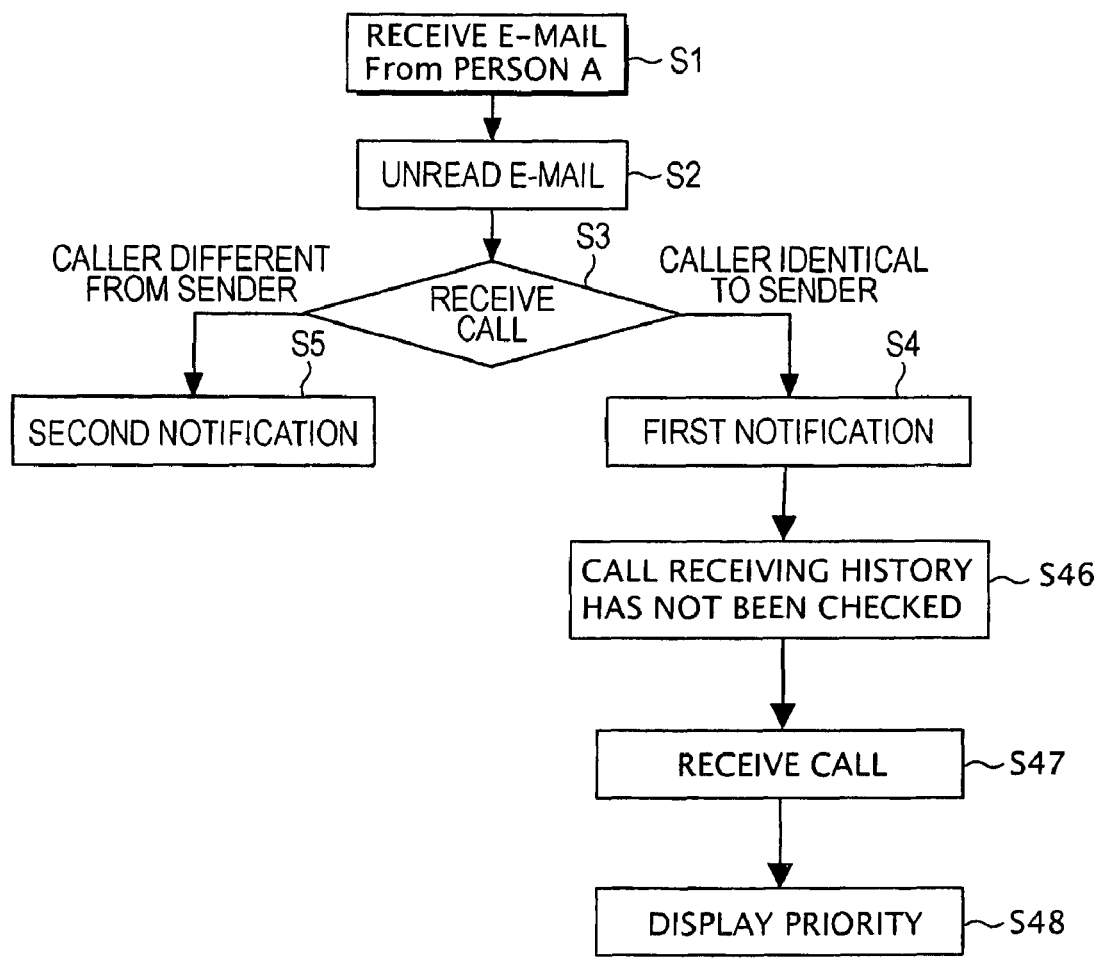
FIG. 4 is a flowchart illustrating a notification performed when a phone call is received after an e-mail is received, according to one aspect of the present disclosure.

As shown in FIG. 4, the controller 34 receives an e-mail using the second communication function 31B in step S1.

While the received e-mail remains unread in step S2, a phone call is received using the first communication function 31A in step S3.

When it is determined that a sender of the e-mail and a caller of the phone call are an identical person, the controller 34 controls the notification unit 33 such that the first notification in the first mode is performed in response to the reception of the phone call in step S4.

On the other hand, when it is determined that the sender of the e-mail is different from the caller of the phone call, the controller 34 controls the notification unit 33 such that the second notification in the second mode is performed in response to the reception of the phone call in step S5.

Second Reception Type (E-Mail Reception, Phone Call Reception and then Phone Call Reception)

Referring to in FIG. 4, a user received an e-mail and then a phone call, and it was found that the sender of the e-mail and the caller of the phone call were an identical person (person A).

After the step S4, while a reply has not been performed in response to the reception of the phone call (that is, a user has not answered the phone call or the user has not called back) in the step S46, another phone call is received by the first communication function 31A in the step S47.

When it is determined that a caller of the phone call is different from the person A, that is, the caller is person B, a notification indicating the reception regarding the person A is preferentially displayed in reception history or a notification indicating that the reception regarding the person A has priority is displayed in the step S48.

In this reception type, when a call-back function is used, an outgoing call to the person A is preferentially performed.

Third Reception Type (Phone Call Reception and then E-Mail Reception)

Figure 5:
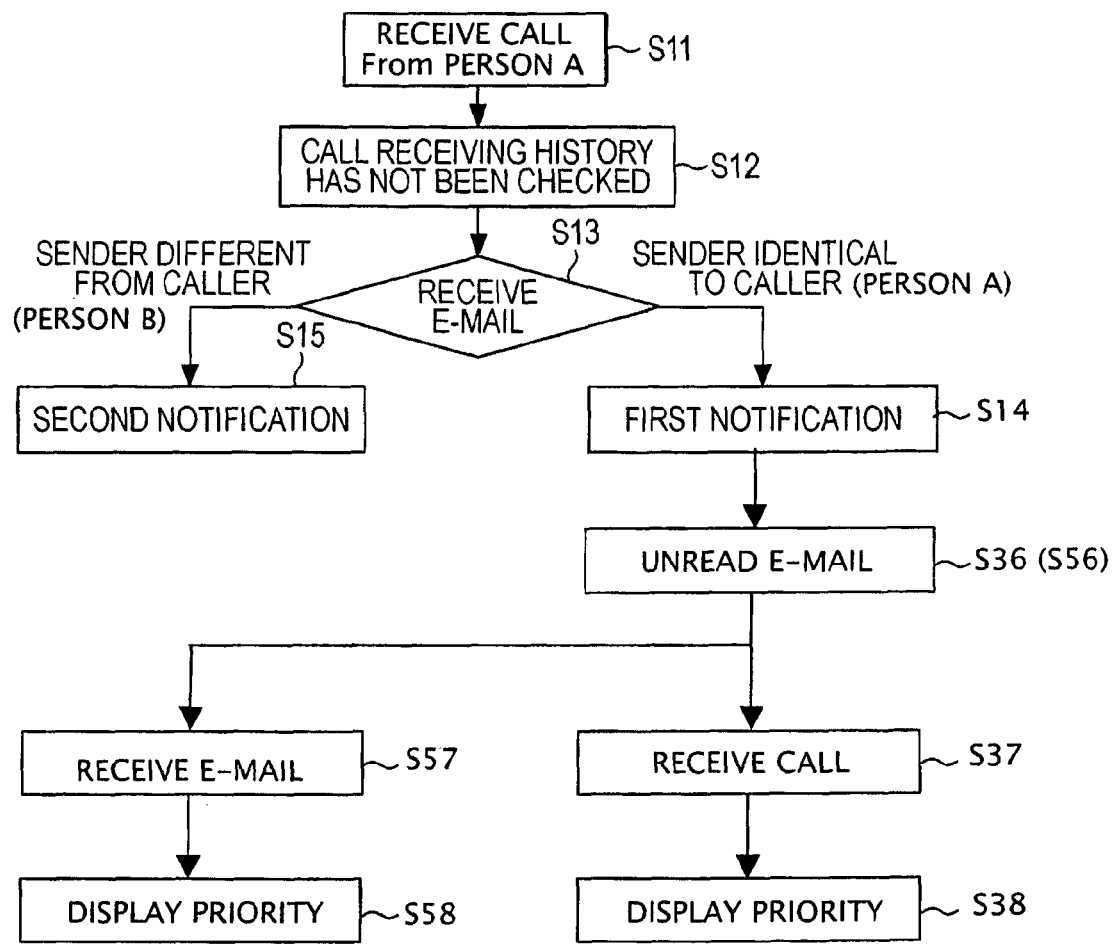
FIG. 5 is a flowchart illustrating a notification performed when an e-mail is received after a phone call is received, according to one aspect of the present disclosure.

As shown in FIG. 5, the controller 34 receives a phone call using the first communication function 31A in step S11. When the phone call is received in step S11 but the user does not answer the received phone call in step S12, an e-mail is received by the second communication function 31B in step S13.

When it is determined that the caller of the phone call and a sender of the e-mail are an identical person, the controller 34 controls the notification unit 33 such that the first notification in the first mode is performed in response to the reception of the e-mail in step S14.

On the other hand, when it is determined that the sender of the e-mail is different from the caller of the phone call, the controller 34 controls the notification unit 33 such that the second notification in the second mode is performed in response to the reception of the e-mail in step S15.

Fourth Reception Type (Phone Call Reception, E-Mail Reception and then Phone Call Reception)

Referring to FIG. 5, a user received a phone call and then an e-mail, and it was found that the caller of the phone call and the sender of the e-mail were an identical person (person A).

After the step S14, while a reply has not been performed in response to the reception of the e-mail (that is, the e-mail has not been viewed, for example) in the step S36, another phone call is received by the first communication function 31A in the step S37.

When it is determined that a caller of the phone call is different from the person A, that is, the caller is person B, a notification indicating the reception regarding the person A is preferentially displayed in reception history or a notification indicating that the reception regarding the person A has priority is displayed in the step S38.

In this reception type, when a call-back function is used, an outgoing call to the person A is preferentially performed.

Fifth Reception Type (Phone Call Reception, E-Mail Reception and then E-Mail Reception)

Referring to FIG. 5, a user received a phone call and an e-mail and it was found that the caller of the phone call and the sender of the e-mail were an identical person (person A).

After the step S14, while a reply has not been performed in response to the reception of the e-mail (that is, the e-mail has not been viewed, for example) in the step S56, another e-mail is received by the second communication function 31B in the step S57.

When it is determined that a sender of the e-mail is different from the person A, that is, the sender is person B, a notification indicating the reception regarding the person A is preferentially displayed in reception history or a notification indicating that the reception regarding the person A has priority is displayed in the step S58.

In this reception type, when a call-back function is used, an outgoing call to the person A is preferentially performed.

Sixth Reception Type (E-Mail Reception, Phone Call Reception and then E-Mail Reception)

Figure 6:
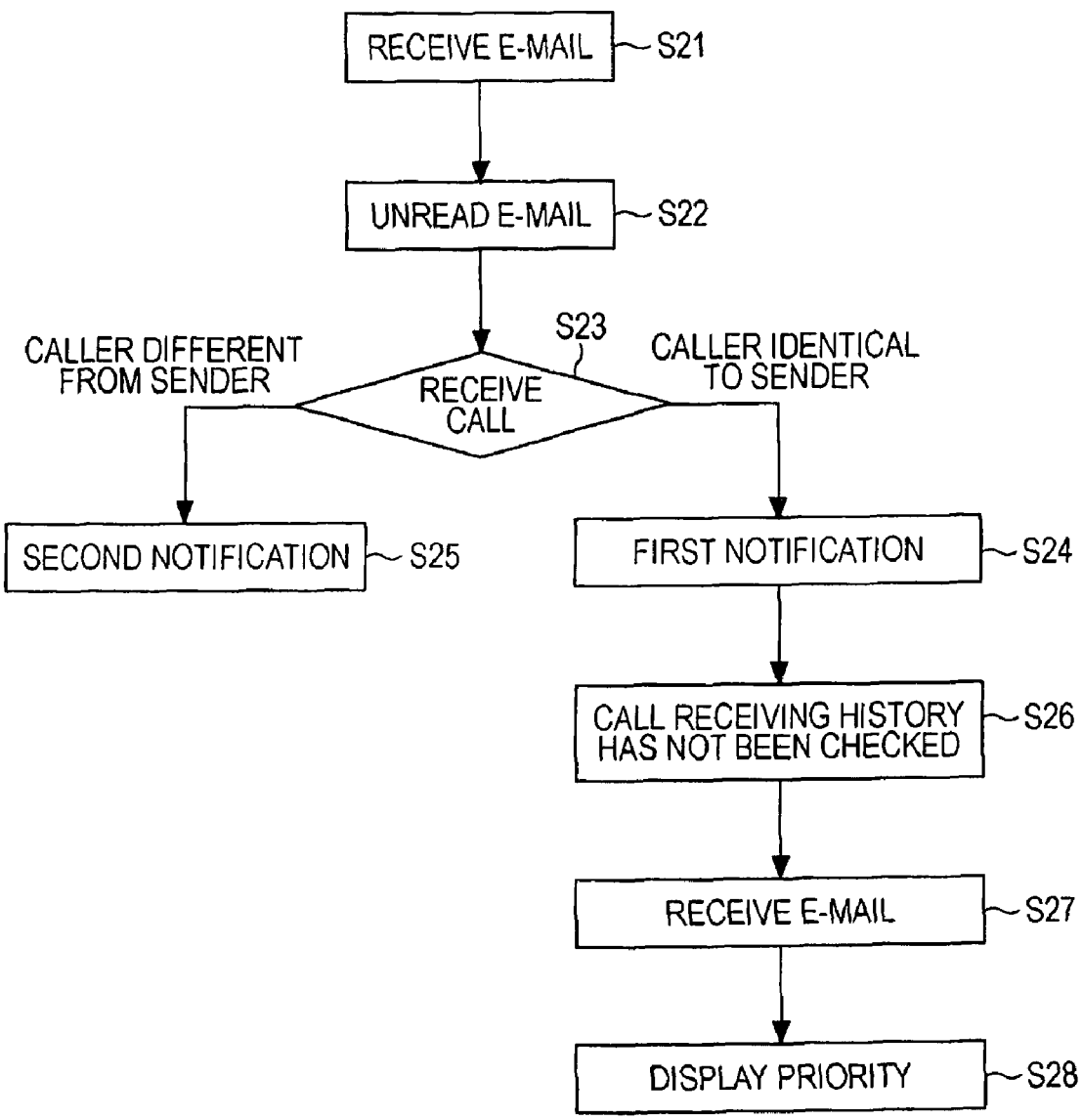
FIG. 6 is a flowchart illustrating a notification performed when a phone call is received after an e-mail is received, and thereafter, an e-mail is further received, according to one aspect of the present disclosure.

As shown in FIG. 6, the controller 34 receives an e-mail using the second communication function 31B in step S21. When the received e-mail remains unread in step S22, a phone call is received using the first communication function 31A in step S23.

When it is determined that the sender of the e-mail is different from the caller of the phone call, the controller 34 controls the notification unit 33 such that the second notification in the second mode is performed in response to the reception of the phone call in step S25.

On the other hand, when it is determined that a sender of the e-mail and a caller of the phone call is an identical person, the controller 34 controls the notification unit 33 such that the first notification in the first mode is performed in response to the reception of the phone call in step S24.

When the sender of the e-mail and the caller of the phone call are an identical person (person A) and a reply to the reception of the phone call has not been performed (for example, a case where the user has not answered the phone call or the user has not called back) in step S26, the controller 34 receives an e-mail by the second communication function 31B in step S27.

When it is determined that a sender of the e-mail is different from the person A, that is, the sender is person B, a notification indicating the reception regarding the person A is preferentially displayed in reception history or a notification indicating that the reception regarding the person A has priority is displayed in step S28.

If the mobile phone device 1 receives the phone call from the sender of the e-mail which arrived first, a pop-up notification indicating that the two e-mails have arrived is displayed in the display 21. Then, after a predetermined operation is performed, information (a name of the sender, for example) on the e-mail which arrived first is displayed in the display 21.

In this reception type, when a call-back function is used, an outgoing call to the person A is preferentially performed.

In the foregoing exemplary reception types, an interval between the reception of the e-mail and the reception of the phone call is not particularly limited. Therefore, as long as the received e-mail is unread, the notification indicating the reception of the phone call from the identical person corresponds to the first notification in the first mode.

As a modification of the foregoing reception types, even in a case where a phone call (or an e-mail) is received from a third party (person B) in a period of time between a time at which an e-mail (or a phone call) is first received from a person (person A) and a time at which a phone call (an e-mail) is received from the identical person (person A), a notification indicating the reception of the phone call (or the e-mail) from the identical person (person A) received after the reception of the phone call (or the e-mail) from the third party (person B) corresponds to the first notification in the first mode.

In this case, even when an e-mail (a phone call) from the third party (person B) is received after the foregoing operation, a notification indicating the reception of the e-mail (phone call) corresponds to the first notification in the first mode.

In the first notification in the first mode, even when a manner mode (a mode in which sound is not played and vibration is activated for a notification indicating a reception of an e-mail, for example) is set or a silent mode (a mode in which sound is not played and vibration is not activated for a notification indicating a reception of an e-mail, for example) is set, the manner mode and the silent mode may be forcibly cancelled so that the sound is played or the vibration is activated.

As described above, in a case where an e-mail is first transmitted but a reply to the e-mail is not received, and therefore, a phone call is made, when a sender of the e-mail and a caller of the phone call is an identical person, the first notification in the first mode is performed for indicating a reception of the phone call. Accordingly, an effective notification in accordance with a degree of demand or urgency can be performed, and consequently, a notification which is important for the user can be reliably performed.

In a state in which an e-mail was received by the second communication function 31B and the received e-mail has not been read, when a phone call is received by the first communication function 31A or when a phone call is received by the first communication function 31A but the user does not answer the phone call and thereafter an e-mail is received by the second communication function 31B, the controller 34 may perform morphological analysis on text (a title or a main body) of the e-mail so as to analyze content of the e-mail. When it is determined that a word representing urgency (for example, "urgency", "emergency", or "hurry") or a message representing a request of contact (for example, "contact me", "call me", or "mail me") is included in the e-mail, the controller 34 may control the notification unit 33 so that the first notification in the first mode is performed.

As described above, in this embodiment, the mobile phone device 1 has a function of performing the first notification in the first mode which is different from the preset mode in a case where a plurality of e-mails and phone calls are received by the plurality of communication functions included in the communication unit 31. However, the present invention is not limited to this, and the function may be included in an external server.

In this case, as shown in FIG. 7, a server 200 serving as the external server includes a database 238, a caller/sender inquiry unit 237, a second storage unit 235, and an instruction unit 236. The database 238 includes names of users registered therein who communicate through first and second communication devices 201A and 201B. The caller/sender inquiry unit 237 accesses the database 238 when a communication is performed using the first communication device 201A to the second communication device 201B so as to make an inquiry about a caller or a sender who uses the communication device 201A. The second storage unit 235 stores a result of the inquiry performed by the caller/sender inquiry unit 237. The instruction unit 236 instructs the second communication device 201B to perform a notification in a preset mode (the second mode) when a communication is performed using the first communication device 201A to the second communication device 201B.

Furthermore, in a case where a first communication is performed using a first communication function included in a communication unit 231A included in the first communication device 201A, an inquiry about a caller or a sender of the communication is performed by the caller/sender inquiry unit 237, and information on a result of the inquiry is stored in the second storage unit 235. In accordance with the stored information, the instruction unit 236 instructs the second communication device 201B to perform a notification in the preset mode (the second mode). In a state in which a reply is not performed in response to the notification performed by the second communication device 201B in the preset mode and a second communication is performed by a second communication function included in the first communication device 201A, when it is determined that a caller or a sender of the second communication is identical to the caller or the sender of the first communication in accordance with the information stored in the second storage unit 235, the instruction unit 236 instructs the second communication device 201B to perform the first notification in the first mode which is different from the preset mode.

The second communication device 201B controls a notification unit 233B so that a notification in an appropriate mode is performed when the server 200 issues a command indicating that the second notification in the preset mode (second mode) or the first notification in the first mode, which is different from the preset mode, is performed. Specifically, the above-described examples (examples in which sound and light are used) may be employed in the first and second modes. However, the present invention is not limited to this.

Note that although embodiments and various modifications have been described hereinabove, various combinations of some techniques described in the embodiments and the modifications may be used for mobile phone devices and communication systems.

Note that, in the foregoing embodiment of the mobile phone device, although the caller or the sender of the first reception of the first communication function and the caller or the sender of the second reception of the second communication function are an identical person, a notification in a mode which is different from a mode used when the caller or the sender of the first reception of the first communication function is different from the caller or the sender of the second reception of the second communication function is performed, an operation described below may be performed, according to one embodiment.

That is, a mode in which a notification is performed when the first reception by the first communication function and the second reception by the second communication function are performed by an identical communication device may be different from a mode in which a notification is performed when the first reception by the first communication function and the second reception by the second communication function are performed by different communication devices.

Furthermore, in the communication system in the foregoing embodiments, although the caller or the sender of the first reception of the first communication function and the caller or the sender of the second reception of the second communication function are an identical person, a notification in a mode which is different from a mode used when the caller or the sender of the first reception of the first communication function is different from the caller or the sender of the second reception of the second communication function is performed, an operation described below may be performed, according to one embodiment.

That is, a mode in which a notification is performed when the first reception by the first communication function and the second reception by the second communication function are performed by an identical communication device may be different from a mode in which a notification is performed when the first reception by the first communication function and the second reception by the second communication function are performed by different communication devices.

Although exemplary embodiments of the present invention have been described with reference to the accompanying drawings in the above, it is understood that the present invention is not limited to the above-described embodiments. Various alterations and modifications to the above embodiments are contemplated to be within the scope of the invention. It should be understood that those alterations and modifications are included in the technical scope of the present invention as defined by the appended claims. For example, the first communication may be selected from a first group of communication types consisting of a phone call, a video phone call, an e-mail, a text message, a facsimile message, a radio frequency signal, and a html web page. Also, the second communication may be selected from a second group of communication types consisting of: a phone call, a video phone call, an e-mail, a text message, a facsimile message, a radio frequency signal, and a html web page. The first communication and the second communication may be different. Information stored in the database includes, but is not limited to, phone numbers (home and/or mobile), facsimile numbers, email addresses, web addresses and the like. Referring to the fax number and email address in the database, the controller can determine whether the senders of facsimiles and emails are same or different. In the case of facsimiles, a "no reply" condition means that a facsimile image is still stored in a memory unit but its data file has not been opened.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A communication device, comprising:
    a communication unit configured to communicate with an external communication device;
    a first storage unit configured to store, when a phone call or an e-mail is received by the communication unit, information on a caller of the phone call or a sender of the e-mail;
    a notification unit configured to perform a notification in response to the reception; and
    a controller configured to determine, when a reply to a first reception is not performed and a second reception is performed, whether a caller or a sender relating to the second reception is identical to a caller or a sender relating to the first reception based on the information on the caller or the sender stored in the first storage unit, and configured to perform a notification in response to the second reception in accordance with a result of the determination.

2. The communication device according to claim 1, wherein the controller controls the notification unit so as to perform a first notification when it is determined that the caller or the sender relating to the second reception is identical to the caller or the sender relating to the first reception whereas the controller controls the notification unit so as to perform a second notification, which is different from the first notification when it is determined that the caller or the sender relating to the second reception is different from the caller or the sender relating to the first reception.

3. The communication device according to claim 2, wherein the controller further controls the notification unit so as to continuously perform the first notification until a reply to the first reception or a reply to the second reception is performed.

4. The communication device according to claim 1, wherein when it is determined that the caller or the sender relating to the second reception is identical to the caller or the sender relating to the first reception, and when a phone call or an e-mail is received as a third reception from a third party who is different from the caller or the sender relating to the first reception and the caller or the sender relating to the second reception after the first reception and the second reception are performed by the communication unit, the control unit controls the notification unit so as to preferentially perform a notification in response to the first and second receptions.

5. The communication device according to claim 1, wherein the first reception comprises receiving a phone call and the second reception comprises receiving an e-mail communication.

6. The communication device according to claim 1, wherein the first reception comprises receiving an e-mail communication and the second reception comprises receiving a phone call.

7. The communication device of claim 1, wherein:
    the first reception comprises receiving a first communication selected from a first group of communication types consisting of: a phone call, a video phone call, an e-mail, a text message, a facsimile message, a radio frequency signal, and a html web page; and
    the second reception comprises receiving a second communication selected from a second group of communication types consisting of: a phone call, a video phone call, an e-mail, a text message, a facsimile message, a radio frequency signal, and a html web page.

8. The communication device of claim 7 wherein the first communication and the second communication comprise different communication types.

9. The communication device according to claim 1,
wherein the first storage unit stores information on an external communication device which made the phone call or which sent the e-mail relating to the first reception as the information on the caller or the sender relating to the first reception, and
wherein the controller determines whether the caller or the sender relating to the second reception is identical to the caller or the sender relating to the first reception by comparing information on an external communication device which made the phone call or which sent the e-mail relating to the second reception with the information on the external communication device which made the phone call or which sent the e-mail relating to the first reception which is stored in the first storage unit.

10. A communication system, comprising:
a server for managing communications between a plurality of communication devices, wherein each communication device comprises:
a communication unit configured to communicate with other communication devices through the server;
a notification unit configured to perform a notification in response to a reception performed by the communication unit; and
a controller configured to control the notification performed by the notification unit;
wherein the server comprises:
a storage unit configured to store, when a first communication from a first communication device to a second communication device among the plurality of communication devices is performed, information on a caller or a sender relating to the first communication; and
an instruction unit configured to determine whether the first communication has been performed between the first and second communication devices, and configured to instruct the notification unit to transmit a notification to the second communication device in a preset mode in a case where it is determined that the first communication has not been performed, and a second communication to the second communication device has been performed, and it is determined that a caller or a sender relating to the second communication is identical to a caller or a sender relating to the first communication based on the information on the caller or the sender relating to the first communication,
wherein the controller o instructs the notification unit to perform a notification in the preset mode when the communication unit of the second communication device receives a notification instruction signal.

11. The communication system according to claim 10,
wherein the instruction unit instructs the notification unit of the second communication device to perform two different notifications, one being performed when it is determined that the caller or the sender of the second communication is identical to the caller or the sender of the first communication in accordance with the information on the caller or the sender relating to the first communication and the other being performed in a case where it is determine that the caller or the sender of the second communication is different from the caller or the sender of the first communication in accordance with the information on the caller or the sender relating to the first communication.

12. The communication system according to claim 10,
wherein the second storage unit stores information on an external device which made a phone call or which sent an e-mail relating to the first communication as the information on the caller or the sender relating to the first communication, and
wherein the instruction unit determines whether the caller or the sender relating to the second communication is identical to the caller or the sender relating to the first communication by comparing information on an external communication device which made a phone call or which sent an e-mail relating to the second communication with the information of the caller or the sender relating to the first communication in accordance with the information stored in the second storage unit.

13. A notification method for a communication device, comprising:
receiving a first communication signal;
receiving a second communication signal;
determining, by a controller, when a reply to the first communication signal is not performed and the second communication signal is received, whether an entity associated with the first communication signal is identical to an entity associated with the second communication signal;
performing a first notification if it is determined that the entity associated with the first communication signal is identical to the entity associated with the second communication signal; and
performing a second notification different from the first notification if it is determined that the entity associated with the first communication signal is not identical to the entity associated with the second communication signal.

14. The method of claim 13 wherein the first communication signal comprises a phone call signal and the second communication signal comprises an e-mail signal.

15. The method of claim 13, wherein:
the first communication signal is selected from a first group of communication signal types consisting of: a phone call, a video phone call, an e-mail, a text message, a facsimile message, a radio frequency signal, and a html web page; and
the second communication signal is selected from a second group of communication signal types consisting of: a phone call, a video phone call, an e-mail, a text message, a facsimile message, a radio frequency signal, and a html web page.

16. The method of claim 15 wherein the first and second communication signals comprise different communication signal types.

* * * * *